United States Patent [19]
Bhattacharyya et al.

[11] Patent Number: 5,626,794
[45] Date of Patent: May 6, 1997

[54] PROCESS FOR HYDROSHIFTING DIMETHYL ETHER

[75] Inventors: Alakananda Bhattacharyya, Wheaton; Arunabha Basu, Naperville, both of Ill.

[73] Assignee: Amoco Corporation, Chicago, Ill.

[21] Appl. No.: 597,209

[22] Filed: Feb. 6, 1996

Related U.S. Application Data

[63] Continuation of Ser. No. 356,492, Dec. 15, 1994, Pat. No. 5,498,370.

[51] Int. Cl.$^6$ .................... C07C 1/00; C07C 1/02
[52] U.S. Cl. .................. 252/373; 518/700; 518/703
[58] Field of Search ................ 252/373; 518/700, 518/703

[56] References Cited

U.S. PATENT DOCUMENTS

| | | | |
|---|---|---|---|
| 4,046,522 | 9/1977 | Chen et al. | 48/102 A |
| 4,193,259 | 3/1980 | Muenger et al. | 60/39.04 |
| 4,202,167 | 5/1980 | Suggitt et al. | 60/39.02 |
| 4,958,488 | 9/1990 | Wilkes et al. | 60/39.55 |
| 5,043,150 | 8/1991 | Hiltunen et al. | 423/239 |

FOREIGN PATENT DOCUMENTS 2085314  4/1982  United Kingdom .

OTHER PUBLICATIONS

Journal of Catalysis 125, 571–573 (1990) Effect of Hydrogen reduction on Activity and Selectivity of Methanol Decomposition over Titanium Oxide—Imai et al.

*Primary Examiner*—Gary Geist
*Assistant Examiner*—Sreeni Padmanabhan
*Attorney, Agent, or Firm*—Frederick S. Jerome; Thomas A. Yassen; Robert E. Sloat

[57] ABSTRACT

A process for hydroshifting dimethyl ether is described which comprises passing a feed stream which includes dimethyl ether and steam to a hydroshifting reaction zone including an essentially alkali metal-free catalytic composition substantially composed of copper or nickel in elemental form. The process produces a hydroshifted product stream which is relatively rich in hydrogen, carbon monoxide, and carbon dioxide.

The feed stream can be transported relatively easily in liquid form at comparatively low pressures. The hydroshifting reaction zone can include a hydrolysis reaction zone and a water-gas shift reaction zone. The hydrolyzed product and the water-gas shift product can be recovered to obtain hydrogen and carbon dioxide, respectively. Additionally, the hydroshifted product stream can be blended with an oxidizing stream and combusted to drive a turbine in order to generate mechanical energy.

20 Claims, 1 Drawing Sheet

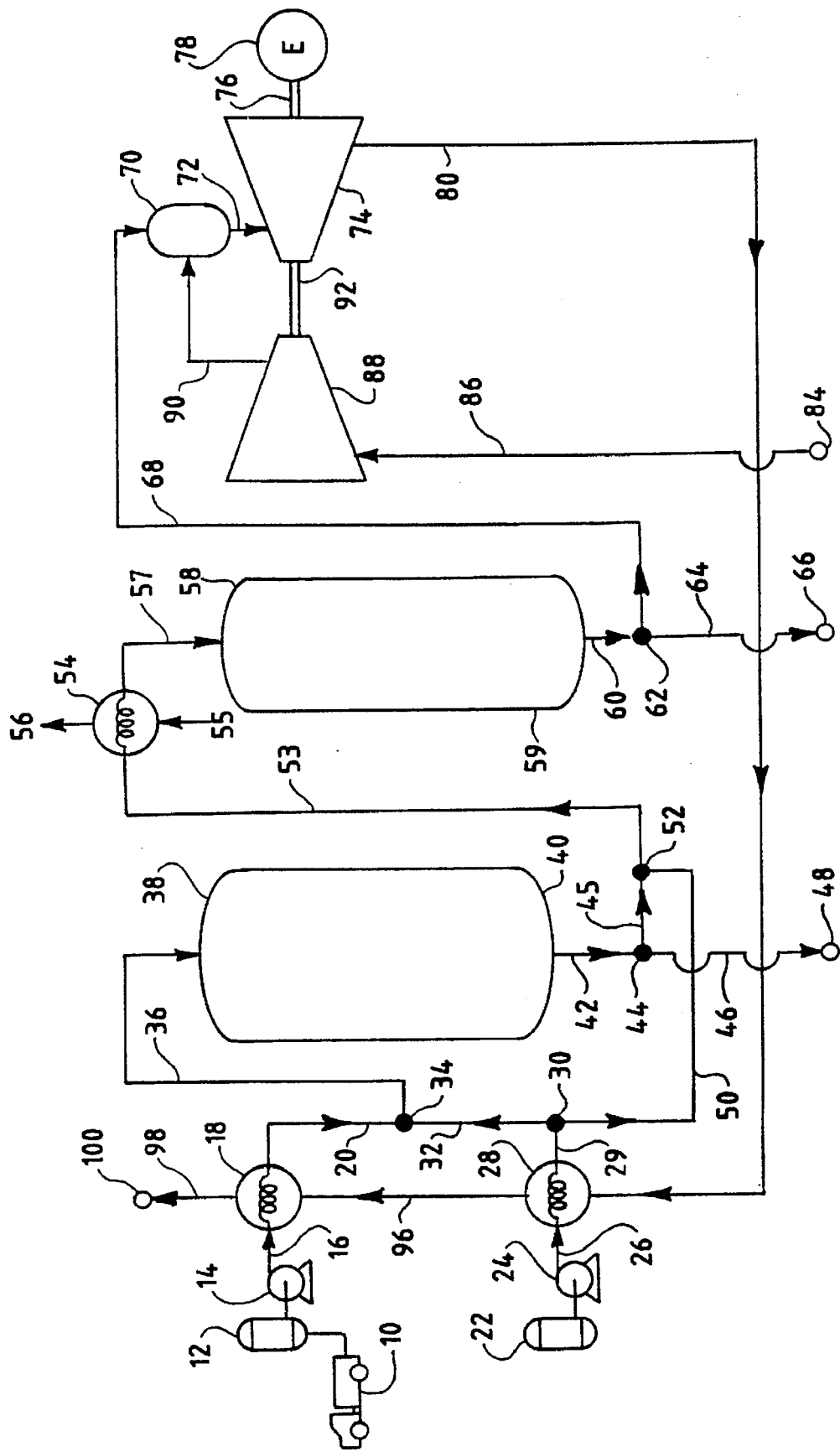

PROCESS FOR HYDROSHIFTING DIMETHYL ETHER

This Application is a continuation of Ser. No. 356,492 filed Dec. 15, 1994 U.S. Pat. No. 5,498,370.

BACKGROUND OF THE INVENTION

I. Field of the Invention

The invention relates generally to the utilization of dimethyl ether and the production of hydrogen and carbon oxides. More specifically, the invention relates to a process for catalytically reacting dimethyl ether in the presence of steam.

II. Description of the Prior Art

The conversion of low molecular weight alkanes, such as methane, to synthetic fuels or chemicals has received increasing attention as low molecular weight alkanes are generally available from secure and reliable sources. For example, natural gas wells and oil wells currently produce vast quantifies of methane. In addition, low molecular weight alkanes are generally present in coal deposits and may be formed during mining operations, in petroleum processes, and in the gasification or liquefaction of coal, tar sands, oil shale, and biomass.

Many of these alkane sources are located in relatively remote areas, far from potential users. Accessibility is a major obstacle to effective and extensive use of remotely situated methane, ethane and natural gas. Costs associated with liquefying natural gas by compression or, alternatively, constructing and maintaining pipelines to transport natural gas to users are often prohibitive. Consequently, methods for converting low molecular weight alkanes to more easily transportable liquid fuels and chemical feedstocks are desired and a number of such methods have been reported.

The reported methods can be conveniently categorized as direct oxidation routes or as indirect syngas routes. The direct oxidative routes convert lower alkanes to products such as methanol, gasoline, and relatively higher molecular weight alkanes. In contrast, the indirect syngas routes involve the production of synthesis gas as an intermediate product.

Routes are known for converting methane to dimethyl ether. For example, methane is steam reformed to produce synthesis gas. Thereafter, dimethyl ether and methanol can be manufactured simultaneously from the synthesis gas, as described in U.S. Pat. No. 4,341,069 issued to Bell et al. The '069 Patent recommends a dimethyl ether synthesis catalyst having copper, zinc, and chromium co-precipitated on a gamma-alumina base. Interestingly, the '069 Patent states that dimethyl ether product can be charged as power generator fuel to a combustor of a gas turbine-prime mover arrangement, either alone or simultaneously with synthesis gas.

Alternatively, methane is converted to methanol and dimethyl ether is subsequently manufactured from methanol by passing a mixed vapor containing methanol and water over an alumina catalyst, as described in an article by Hutchings in New Scientist (Jul. 3, 1986)35.

Having a relatively low vapor pressure, dimethyl ether is readily transportable. Moreover, dimethyl ether can be economically produced in relatively small quantities, as compared to materials such as compressed natural gas which require economies of scale associated with large cryogenic plants to be produced competitively. On the other hand, synthesis gas reportedly produces very little atmospheric pollution when combusted with air as fuel. Therefore, a practical process for converting dimethyl ether to synthesis gas on a commercial scale would be attractive to, among others, natural gas producers situated far from fuel consumers.

Known processes for producing synthesis gas typically react hydrocarbons with steam at elevated temperature over a catalyst. Generally, more complex hydrocarbons are converted to methane which is then steam reformed to produce hydrogen or synthesis gas.

United Kingdom Patent Application GB 2213496 A listing Lywood as inventor describes the production of hydrogen-containing gas streams by an endothermic catalyzed reforming between methane and steam. The '496 Application proposes the following equations for the steam reforming of methane:

$$CH_4 + H_2O \rightarrow CO + 3H_2 \qquad 1.$$

$$CH_4 + 2H_2O \rightarrow CO_2 + 4H_2 \qquad 2.$$

$$CH_4 + CO_2 \rightarrow 2CO + 2H_2 \qquad 3.$$

U.S. Pat. No. 4,592,903 issued to Osman et al., states that carbon monoxide can be endothermically converted to carbon dioxide and hydrogen through a reaction termed a water-gas shift, represented by the equation:

$$CO + H_2O \rightarrow CO_2 + H_2 \qquad 4.$$

Reportedly, the "shift" reaction, can be accomplished in two shift conversion vessels operating at different temperatures to maximize yield. The '903 patent states that a temperature of from about 600 to 900 degrees F. and a pressure of about 300 to 1,000 psig is effective in a high-temperature shift converter containing a supported, chromium-promoted iron catalyst. The '903 Patent further states that a low-temperature shift conversion takes place over a catalyst comprising a mixture of zinc and copper oxides at a temperature of from about 400 to 500 degrees F. and a pressure of from about 300 to about 1,000 psig.

It is important to distinguish between the steam reforming of hydrocarbons, as described above, and the partial oxidation of hydrocarbons. The partial oxidation of methane produces two moles of diatomic hydrogen for each mole of methane reacted. In contrast, the steam reforming of methane produces three moles of diatomic hydrogen per mole of reacted methane.

The partial oxidation of methane is described, for example, in U.S. Pat. No. 4,618,451 issued to Gent. The '451 Patent states that methane is reacted with oxygen from an air separation plant, the proportion of oxygen being less than sufficient for complete combustion. A hot gas containing hydrogen and carbon monoxide is said to be produced. The '451 patent also states that steam or nitrogen can be present during the combustion to act as a temperature modifier and to avoid soot formation. Additional hydrocarbon is reportedly injected into the hot gas, and the resulting gas mixture is reacted over a steam reforming catalyst.

A particular class of partial oxidation processes for converting methane or natural gas to synthesis gas are known as autothermal processes. By convention, the autothermal process includes an exothermic oxidation step and an endothermic steam reforming step which are in approximate heat balance. For example, U.S. Pat. No. 5,112,257 issued to Kobylinski and assigned to the assignee of the present invention, describes an autothermal process for converting natural gas to synthesis gas which includes the steps of mixing natural gas with air, subjecting a resulting mixture to simultaneous partial oxidation and steam reforming reactions, and subsequently reacting unconverted alkanes with water in the presence of a catalyst having steam reforming activity.

Processes which produce hydrogen or hydrogen-containing mixtures by reacting a single-carbon saturated alcohol, methanol, with steam are collectively termed methanol steam reforming processes. U.S. Pat. No. 4,091,086 issued to Hindin et al. describes a process for producing hydrogen by reacting steam with methanol in the presence of a catalytic composition at elevated temperatures. The '086 Patent reports states that methanol can be converted to hydrogen in a single-stage reaction over a catalytic composition comprising zinc oxide, copper oxide, thorium oxide, and aluminum oxide. Moreover, the '086 Patent states, without citing authority or presenting evidence in support, that the composition catalyzes a purported methanol decomposition. The purported decomposition is described as producing significant amounts of carbon monoxide which are immediately consumed in a water gas shift reaction.

U.S. Pat. No. 4,743,576 issued to Schneider et al. describes a catalyst for the production of synthesis gas or hydrogen from aqueous methanol by dissociation or steam reforming. The catalyst reportedly contains a noble metal component on an oxide carrier which comprises an oxide of cerium or titanium and, also, an oxide of zirconium or lanthanum.

U.S. Pat. No. 4,865,624 issued to Okada describes a process for reacting methanol with steam including a decomposition reaction zone regulated at a temperature between 250 and 300 degrees C. and a conversion reaction zone regulated between 150 and 200 degrees. The '624 patent postulates an alleged methanol decomposition for producing hydrogen and carbon monoxide directly from methanol. The conversion reaction zone described in the '624 Patent is apparently intended to promote the well-known water gas shift reaction.

An integrated turbo-electric power generation system which incorporates methanol reforming as a source of fuel and as a means of heat recovery is described in sales literature circulated by the New Energy and Industrial Technology Development Organization under the authority of the Ministry of International Trade and Industry of Japan cerca 1985. The sales literature states that methanol and steam are passed through catalysts at temperatures in the range of 250 to 350 degrees C. to produce hydrogen and carbon dioxide in an endothermic reaction. The hydrogen-containing gas is reportedly combusted with air to drive a turbine. The sales literature indicates that the reforming reactor charge and the combustion air stream can be heat exchanged with the turbine exhaust to promote energy efficiency.

Despite some earlier speculation regarding the existence of a direct methanol decomposition mechanism, practitioners generally agree that methanol steam reforming proceeds by a mechanism which does not involve the direct decomposition of methanol to hydrogen and carbon monoxide. Rather, it is accepted that the steam reforming of methanol creates methyl format and formic add as intermediaries. For example, an article by Jiang et al., Applied Catalysis A: General, 97 (1993) 145–158 Elsevier Science Publishers B. V., Amsterdam, cites studies and presents experimental data indicating that steam reforming of methanol proceeds via dehydrogenation to methyl formate, hydrolysis of methyl formate to formic acid, and decomposition of formic acid to carbon dioxide and hydrogen. According to the Jiang et al. article, no carbon monoxide production was detected while passing methanol over a copper, zinc oxide and alumina catalyst at temperatures below 250 degrees C. The Jiang et al. article reports that significant amounts of carbon monoxide were formed only at temperatures over 300 degrees C. Moreover, the Jiang et al. article states that methanol steam reforming proceeds in accord with the following equations:

$$2CH_3OH \rightarrow CH_3OCHO + 2H_2 \qquad 5.$$

$$CH_3OCHO + H_2O \rightarrow CH_3OH + HCOOH \qquad 6.$$

$$HCOOH \rightarrow CO_2 + H_2 \qquad 7.$$

UK Patent Application GB 2085314 A listing Twigg as inventor describes a catalytic process for reacting a hydrocarbon with steam in net endothermic conditions to produce a gas containing carbon oxides and hydrogen. The process is reportedly carried out using a catalyst comprising the product of thermally decomposing and reducing intimately associated compounds of nickel and/or cobalt and at least one difficultly reducible metal. Reportedly, the catalyst also comprises a water-insoluble compound of an alkali metal oxide with an acidic or amphoteric oxide or mixed oxide.

The '314 Application states that the alkali metal, usually sodium or potassium, is chosen on the basis of the vapor pressure of its hydroxide form, so as to be available as an alkaline metal hydroxide to catalyze a reaction between carbon deposited on the catalyst and steam. The '314 Application speculates that the starting hydrocarbon can be any of those proposed for use with a catalytic steam/hydrocarbon reaction including methane, natural gas, liquified petroleum gas, naphtha, methanol, dimethyl ether, and isobutyraldehyde. However, as explained below the presence of potassium hydroxide actually hinders the reaction of dimethyl ether and steam.

In order to better utilize remotely situated sources of natural gas, to transport the energy inherent in natural gas in a safer and more economic manner, and to provide a fuel which creates very little atmospheric pollution when combusted in air, a commercially practical method for transforming dimethyl ether and steam to synthesis gas is desired. Preferably, the improved method is suitable for integration into modem power generation schemes.

SUMMARY OF THE INVENTION

The invention is a method for hydrolyzing dimethyl ether with steam to produce a mixture containing carbon oxides and hydrogen. The method employs a metal in substantially elemental form which catalyzes the hydrolysis. A water-gas shift reaction converts carbon monoxide, which is usually present in the hydrolysis product, to relatively more inert carbon dioxide. The hydrolysis and shift reactions take place in a single reaction zone or, alternatively, in separate reaction zones where reaction conditions can be individually optimized. When separate reaction zones are provided, heat is efficiently transferred from the water-gas shift reaction zone to the hydrolysis reaction zone. The hydroshifted product stream can be utilized as fuel to power a turbine, and and an integrated heat transfer scheme can be used to recover heat from the turbine exhaust stream.

In one aspect, the invention is a process for hydroshifting dimethyl ether which comprises passing a feed stream which includes about one to about six molar parts steam and one molar part dimethyl ether to a hydroshifting reaction zone including an essentially alkali metal-free catalytic composition substantially composed of copper or nickel in elemental form. The feed stream enters the hydroshifting reactor zone at a temperature of about 150 to about 800 degrees C. A product stream is produced which is relatively rich in hydrogen, carbon monoxide, and carbon dioxide as compared to the feed stream.

In another aspect the invention is a process for hydroshifting dimethyl ether which comprises passing a feed stream which includes about one to about six molar parts steam and one molar part dimethyl ether at a temperature of about 300 to about 800 degrees C. to a hydrolysis reaction zone including an essentially alkali metal-free catalytic composition substantially composed of a non-noble metal in elemental form. A hydrolyzed stream, which is relatively rich in hydrogen, carbon monoxide, and carbon dioxide, is produced in the hydrolysis reaction zone and passed at a temperature of about 150 to less than about 300 degrees C. to a water-gas shift reaction zone including a water-gas shift reaction catalyst. In the shift reaction zone, a product stream is produced which is relatively rich in hydrogen and carbon dioxide as compared to the hydrolyzed stream.

In yet another aspect, the invention is a process for hydroshifting dimethyl ether and generating power. The process comprises vaporizing a predominantly liquid mixture to produce a predominantly gaseous feed stream including one molar part dimethyl ether and about one to about six molar parts steam. The feed stream is passed at a temperature of about 150 to about a temperature of 800 degrees C. to a hydroshifting reaction zone including an essentially alkali metal-free catalytic composition substantially composed of a metal in elemental form. A hydroshifted stream is produced and mixed with an oxidizing stream. The resulting mixture is combusted to produce heat and a combustion product stream which drives a turbine for generating mechanical power. The turbine also produces an exhaust stream, which can be utilized to vaporize the liquid mixture which gives rise to the gaseous feed stream.

BRIEF DESCRIPTION OF THE DRAWING

FIG. 1 is a schematic flow diagram for a preferred aspect of the present invention in which synthesis gas produced by hydroshifting dimethyl ether with steam is combusted to provide mechanical and thermal energy.

DETAILED DESCRIPTION OF PREFERRED ASPECTS OF THE INVENTION

In a preferred aspect, the invention is a process for hydroshifting dimethyl ether which comprises passing a feedstream that includes a substantial proportion of dimethyl ether to a hydroshifting reaction zone. The feedstream may additionally include methanol, and is preferably the product stream of a process which simultaneously produces dimethyl ether and methanol. U.S. Pat. No. 4,341,069, issued to Bell et al., is hereby incorporated in its entirety, and especially for its teachings regarding dimethyl ether production. The feedstream also includes about one to about six molar parts steam, preferably about two to about four molar parts steam, and most preferably about three molar parts steam based on the amount of dimethyl ether present.

Hydroshifting is defined for the present purposes as a reaction between dimethyl ether and steam, which ultimately produces hydrogen and carbon dioxide. It is believed, although not critical to the success of the invention, that the hydroshifting reaction proceeds by way of at least two component reactions. In the first component reaction, dimethyl ether is hydrolyzed with steam to produce hydrogen, carbon monoxide and carbon dioxide. In the second component reaction, carbon monoxide interacts with steam to produce additional hydrogen and additional carbon dioxide.

Three molar parts of steam are stoichiometrically required to complete the hydroshifting reaction of one molar part of dimethyl ether to hydrogen and carbon dioxide. The hydroshifting reaction can proceed to some extent with less than the stoichiometrically required amount of steam, but carbon monoxide is present in the product stream produced under such reactant-limited conditions. When less than about one molar part of steam is in the feedstream, relatively little of the dimethyl ether is reacted. Conversely, when more than the stoichiometrically required amount of steam is present, dimethyl ether conversion and selectivity for carbon dioxide tend to increase, and the rate of formation of an undesirable carbon-rich by-product known as coke tends to decrease.

Preferably, both of the component reactions take place in a hydroshifting reaction zone. To this end, the feedstream is passed to the hydroshifting reaction zone at a temperature of about 150 to about 800 degrees C., more preferably about 300 to about 600 degrees C., and most preferably about 350 to about 500 degrees C. The entire hydroshifting reaction zone need not operate at a single temperature, and it is contemplated that reaction temperature profiles are adjusted within the above-stated ranges to optimize the composition of the product stream.

Within the hydroshifting reaction zone is an essentially alkali metal-free catalytic composition substantially composed of elemental copper, elemental nickel or a mixture thereof. For the present purposes, the alkali metals are defined as lithium, sodium, potassium, rubidium, cesium and francium. Essentially metal-free in this context means that the alkali metals are not present at all or are present in such minute quantities as to have no more than a negligible effect on catalytic performance. For the present purposes, a metal is in elemental form when the metal has an oxidation number of zero.

The presence of a significant quantity of any of the alkali metals appears to cause a measurable deactivation of catalytic activity for the hydroshifting of dimethyl ether. Conversely, it is hypothesized that a neutral or slightly acidic environment enhances the hydroshifting reaction. Preferably, the catalytic composition includes alumina, more preferably alumina in a form which is slightly acidic.

It is preferred that the hydroshifting reaction zone additionally contains a water gas shift reaction catalyst. Suitable water gas shift catalysts have been developed for reacting carbon monoxide in synthesis gas to produce hydrogen and carbon dioxide, as described in *Catalyst Handbook* 2nd Edition, Chapter 6, edited by M. B. Twigg and published by Wolf Publishg, Limited ©1989.

Preferably, the water gas shift catalyst of the present invention is substantially composed of iron oxide, chromium oxide, copper oxide, zinc oxide or a mixture thereof. More preferably the catalyst is substantially composed of copper oxide and zinc oxide. Most preferably, copper oxide and zinc oxide are present in a ratio of about 1:1.

The water gas shift reaction catalyst may be distributed homogeneously throughout the hydroshifting reaction zone or, preferably, concentrated in localized regions of the hydroshifting reaction zone. For example, the water gas shift reaction catalyst may be concentrated in regions having relatively lower temperatures.

In another aspect, the invention is a process which comprises passing a feedstream, as described above, to a hydrolysis reaction zone in which a hydrolysis reaction takes places between dimethyl ether and steam. The hydrolysis reaction zone produces a hydrolyzed stream which is relatively rich in hydrogen, carbon monoxide and carbon dioxide as compared to the feedstream. The hydrolysis reaction may be viewed as a component reaction of the hydroshifting of dimethyl ether.

The hydrolysis reaction zone includes an essentially alkali metal-free catalytic composition substantially composed of a non-noble metal in elemental form. Preferably, the non-noble metal is vanadium, chromium, manganese, iron, cobalt, nickel, copper or mixtures thereof. Of these, nickel and copper are especially preferred as the non-noble metal.

The non-noble metal is preferably dispersed on a substrate material. For example, the non-noble metal can be impregnated on alumina. It is recommended that the substrate be neutral or slightly acidic.

A feed stream is passed to the hydroshifting reaction zone at a temperature of about 300 to less than about 800 degrees C., preferably about 150 to about 500 degrees C., and more preferably about 375 to about 450 degrees C. As the hydrolysis reaction is endothermic, the hydrolysis reaction zone typically exhibits a temperature profile having progressively cooler temperatures in the direction of flow. However, heat may be transferred from an external source to minimize, or even overcome, the endothermic effect if desired.

The hydrolyzed stream exits the hydrolysis reaction zone and enters a water gas shift reaction zone at a temperature of about 150 to less than about 300 degrees C., more preferably less than about 250 degrees C., and more preferably less than about 200 degrees C. It is necessary to cool the hydrolyzed stream by, for example, heat exchange with another process stream so that the hydrolyzed stream enters the water gas shift reactor-zone in the above-specified temperature range. The water gas shift reaction zone includes a water gas shift reaction catalyst, as described above, which catalyzes a water gas shift reaction to produce hydrogen and carbon dioxide from carbon monoxide and water.

Steam enters the hydrolysis zone and, preferably, additional steam enters the water gas shifting zone so that a total of about two to about four molar parts steam is passed to the reaction zones for each molar part of dimethyl ether which is passed to the hydrolysis reaction zone. More preferably, about two to about three molar parts of steam enters the hydrolysis reaction zone and about one to about two additional molar parts steam enters the water gas shift reaction zone.

It is important that the catalytic composition in the hydrolysis reaction zone includes a significant amount of the non-noble metal in elemental form. However, it is often convenient to ship the catalytic composition in an oxidized form from point of manufacture to point of use. Also, a portion of the non-noble metal may be inadvertently oxidized by, for example, accidental contact with air. Accordingly, it is recommended that the non-noble metal of catalytic composition be treated by passing a reducing stream over the catalytic composition, preferably after the catalytic composition has been loaded into the hydrolysis reaction zone.

Preferably, the reducing stream includes a reducing agent that is selected from the group consisting of hydrogen, carbon monoxide and mixtures thereof. Contact with hydrogen or carbon monoxide at moderate temperatures can reduce the non-noble metal relatively quickly and efficiently.

Alternatively, the reducing stream includes a precursor blend of steam with methane, ethane, propane, methanol, ethanol or mixtures thereof which decomposes in the reaction zone to produce an active agent capable of reducing a significant portion of the non-noble metal to elemental form. The reduction by precursor blend and decomposition generally requires more time as compared to the reduction by hydrogen or carbon monoxide, and may also require a comparatively elevated reducing temperature in order to reduce a significant portion of the non-noble metal. Reducing temperatures of about 100 to about 1000 degrees C. are preferred, more preferably about 200 to about 600 degrees C., and most preferably at 300 to 500 degrees C.

Under appropriate conditions of pressure, temperature and time, steam with dimethyl ether is a suitable precursor blend. However, the steam with dimethyl ether blend requires relatively higher reducing temperatures, comparatively higher temperatures and generally longer reduction periods. For example, an equal molar parts blend of steam with dimethyl ether requires about two hours to reduce a significant portion of the non-noble metal at 350 degrees C. at atmospheric pressure.

In yet another preferred aspect, the invention is a process for hydroshifting dimethyl ether and generating power. The process comprises vaporizing a predominantly liquid mixture to produce a predominantly gaseous feed stream. Preferably, an aqueous solution of dimethyl ether is prepared from liquid streams and vaporized to produce the gaseous feed stream. The composition of the feed stream is described above. The feed stream is passed to a hydroshifting reaction zone including an essentially alkali metal-free catalytic composition, as described above, to produce a hydroshifted stream which is relatively rich in hydrogen, carbon monoxide, and carbon dioxide.

The hydroshifted stream is mixed with an oxidizer stream which, preferably, includes air as an oxidizing agent. Alternatively, the oxidizer stream can include any suitably inert material and an appropriate amount of oxygen. The resulting mixture is combusted to produce a combustion product stream and heat. The combustion product stream drives a turbine which generates useful mechanical power. After mechanical power has been extracted, the combustion product stream exits the turbine as an exhaust stream at a relatively lower pressure. Preferably, heat from the exhaust stream is transferred to the hydroshifting reaction zone. For example, heat from the exhaust stream can be utilized to vaporize the charged stream.

Preferably, the hydroshifting zone includes a hydrolysis zone in which steam reacts endothermically with dimethyl ether and also includes a water-gas shift zone in which steam reacts exothermically with carbon monoxide. The hydrolysis zone contains the catalytic composition and the water-gas shift zone contains a water-gas shift catalyst. Preferably, the feed stream is charged to the hydrolysis zone at a temperature of about 300 to about 800 C. to produce a hydrolyzed stream which is rich in hydrogen, carbon monoxide, and carbon dioxide as compared to the feed stream. It is especially preferred that the hydrolyzed stream is passed to the water-gas shift zone at a temperature in the range of about 150 to less then about 300 C. to produce the hydroshifted stream.

In order to better communicate the invention, still another preferred aspect of the invention is depicted schematically in FIG. 1. Referring now to FIG. 1, a mixture containing dimethyl ether in substantially liquid form is unloaded from a road tanker 10 into a dimethyl ether storage vessel 12. A charge pump 14 transfers the dimethyl ether liquid from the storage vessel 12 through a conduit 16 to a heat exchanger 18 where the dimethyl ether liquid is substantially vaporized. The vaporized dimethyl ether exits the heat exchanger 18 through a conduit 20.

A transfer pump 24 transfers an aqueous stream from a water storage vessel 22 through a conduit 26 to a heat exchanger 28 where the aqueous stream is essentially vaporized to produce a steam stream. The steam stream so produced passes through conduits 29 and 32 and junctions 30 and 34 to join and blend with the vaporized dimethyl ether stream. The blended steam stream passes through a conduit 36 to a hydrolysis reactor 38 which contains a hydrolysis catalyst 40. A hydrolyzed stream, rich in hydrogen, carbon monoxide, and carbon dioxide, leaves the hydrolysis reactor 38 through conduits 42 and 45 and junctions 44 and 52.

It should be apparent that the hydrolyzed stream is a valuable product in itself. A portion of the hydrolyzed stream can optionally be taken through the junction 44 and a conduit 46 for delivery to a destination 48. The hydrolyzed stream may subsequently be separated to recover, for example, carbon monoxide, carbon dioxide or hydrogen. Alternatively, the hydrolyzed stream can be utilized as a feed stock source for chemical manufacturing.

Optionally, a portion of the steam generated in the heat exchanger 28 may be passed through the junction 30 and a conduit 50 to blend with the hydrolyzed stream at the junction 52. Thereafter, the hydrolyzed stream travels through a conduit 53 which, preferably, includes a cooler 54 having an influent cooling stream 55 and an effluent cooling stream 56. The hydrolyzed stream passes from the cooler 54 through a conduit 57 to a water-gas shift reactor 58 which contains a water-gas shift catalyst, as described above.

In the reactor 58, carbon monoxide and water interact to produce carbon dioxide and hydrogen. A shift product stream leaves the reactor 58 through a conduit 60 leading to a junction 62. A portion of the shift product stream can optionally be taken from the junction 62 through a conduit 64 to a destination 66. The shift product stream is relatively rich in carbon dioxide which can be recovered, for example, for use as an ingredient in carbonated beverages for human consumption, or as a feedstock for manufacturing various chemicals.

The balance of the shift product stream is directed through a conduit 68 to a turbine combustor 70. An oxidizing stream is taken from a source 84, for example, an atmospheric intake and heated through a heat exchanger 82. A heated oxidizing stream leaves the heater 82 via a conduit 86, is compressed in a compressor 88, and is passed through a conduit 90 to the 70. Preferably, the compressor 88 raises the pressure of the oxidizing stream to five atmospheres or more, more preferably to about 12 atmospheres or more, and most preferably to about 20 atmospheres or more as measured on the absolute pressure scale. In the combustor 70 the water-gas shift product stream meets the oxidizing stream, and a combustion reaction takes place which liberates heat. Optionally, a combustion promoter catalyst is present in the combustor 70 to enhance the combustion reaction. A combustion product stream leaves the combustor 70 through a conduit 72 and passes to a turbine 74.

The turbine 74 is adapted to remove mechanical energy from the combustion product stream and to produce an exhaust stream which exits the turbine through a conduit 80. The mechanical energy can be used, for example, to turn a shaft 76 which powers an electrical generator 78. Preferably, a portion of the mechanical energy produced by the turbine is used to turn a shaft 92 which turns the compressor 88.

The exhaust stream, although normally at a lower temperature and pressure than the combustion product stream, contains useful thermal energy which can be recovered by heat exchange. For example, the exhaust stream can be passed via the conduit 80 as a heat exchanger 18, whereby the exhaust stream serves as a heat source for vaporizing the aqueous stream and the dimethyl ether stream, respectively. Finally, the exhaust stream exits the heat exchanger 18 through a conduit 98 leading to a disposal destination 100. The destination 100 may be, for example, an elevated vent to atmosphere.

The following examples are presented in order to better communicate the invention. The examples are not intended to limit the scope of the invention in any way.

EXAMPLE 1

Preparation of $Cu_2Mg_2A_{12}(OH)_{12}CO_3$

A three liter, three neck, round bottom flask equipped with a thermometer, a reflux condenser and a mechanical stirrer was charged with 1.2 liter of deionized water, 0.15 g-mol of sodium carbonate and 1.2 g-mol of sodium hydroxide to prepare an alkaline solution. A metal nitrate solution containing 0.20 g-mol of hydrated copper nitrate, 0.20 g-mol of hydrated magnesium nitrate, 0.20 g-mol of hydrated aluminum nitrate, and 1.0 liter of water was prepared and added dropwise to the alkaline solution while stirring over a period of 2 hours. The result was a gelatinous mixture having a pH of 8.77. After the addition was complete, the gelatinous mixture was heated to 85 degrees C. for 15 hours and then cooled. The cooled mixture was filtered, washed with water, and dried overnight under vacuum at 70 degrees C. The dried product had a hydrotalcite-type structure.

EXAMPLE 2

Preparation of $Cu_2Mg_2A_{12}O_7$

The dried material described in Example 1 above was calcined by placing a known amount in an oven at room temperature and increasing the oven temperature at a rate of three degrees C. per minute until 550 degrees C. was achieved. The dried material was maintained at 550 degrees C. for four hours and then separated according to size by sieving. The product was a substantially amorphous material having a memory of the previous hydrotalcite-type structure. The product was designated Catalyst A.

EXAMPLE 3

Preparation of $Cu_3Zn_2Al_2(OH)_{14}CO_3$

A preparation procedure substantially identical to the procedure described in Example 1 above was performed except that this time the metal nitrate solution contained 0.30 g-mol of hydrated copper nitrate, 0.20 g-mol of hydrated zinc nitrate, 0.20 g-mol of hydrated aluminum nitrate and 1.0 liter of water. The resulting gelatinous mixture exhibited a pH of 8.25.

EXAMPLE 4

Preparation of $Cu_3Zn_2Al_2O_8$

The material prepared in Example 3 above was calcined using the procedure described in Example 2 above. The product was designated Catalyst B.

EXAMPLE 5

Preparation of $Cu3.25Zn3.75A_{12}(OH)_{18}CO_3$

The procedure described in Example 1 was utilized again, except that the metal nitrate solution contained 0.325 g-mol of hydrated copper nitrate, 0.375 g-mol of hydrated zinc nitrate, 0.20 g-mol of hydrated aluminum nitrate, and 1.0 liter of water.

EXAMPLE 6

Preparation of $Cu3.25Zn3.73A_{12}O_9$

The material produced in Example 5 above was calcined according to the procedure described in Example 2. The calcine product was designated Catalyst C.

EXAMPLE 7

Commercially Obtained $CuO/ZnO/A_{12}O_3$

A commercially available material composed of about 40 per cent copper oxide, about 45 per cent zinc oxide, about 12 per cent alumina and about 3 per cent graphite binder by weight was ground and sieved to an appropriate mesh size. The sieved material was designated Catalyst D.

EXAMPLE 8

Commercially Obtained $CuO/ZnO/A_{12}O_3$ plus Potassium

Additional potassium in the form of an aqueous potassium carbonate solution was added to a portion of Sample D, which was described in Example 7 above, and then calcined at 550 degrees C. for four hours to produce a material designated Catalyst E containing 2.0 per cent potassium by weight.

EXAMPLE 9

Commercially Obtained $Cu/CuCrO_3$

A commercially available material composed of about 58 per cent copper, about 25 per copper chromate, and about 2 per cent graphite binder by weight was ground and sieved to an appropriate mesh size. The sieved material was designated Catalyst F.

EXAMPLE 10

Hydroshifting Performance of Catalysts A through F

At various times, each of the catalysts was loaded as a two cubic centimeter bed in a quartz tube reactor sealed within a stainless steel containment vessel and heated to 300 degrees C. under a nitrogen purge. When temperatures in the reactor had equilibrated, the nitrogen purge was terminated and a reduction gas stream containing 20 per cent hydrogen and 80 per cent nitrogen by volume was passed at atmospheric pressure through the reactor at 100 standard cubic centimeters per minute for a reduction period of at least two hours.

Each of the reduced catalysts was purged with nitrogen for ten minutes in order to remove any residual hydrogen which might have remained within the reactor. Thereafter, a feed gas containing dimethyl ether, water and nitrogen in molar proportions of 1:3:2, respectively, was passed through the reactor at atmospheric pressure. The feed gas travelled through the reactor in substantially plug flow at 2000 gas hourly space velocity. External block heater temperature were controlled directly, and a thermocouple located at the midpoint of the bed was utilized as a control point for determining when the reactor temperature had stabilized.

A reactor effluent stream left the reactor and entered an ice water cold trap which condensed and separated any unreacted water present in the effluent stream. The balance of the effluent stream was analysed by gas chromotography and, based upon those analyses, conversions and selectivities were calculated. Tables 1 through 5 below present conversions, selectivities and hydrogen to carbon oxide ratios observed at various temperatures during periods of stable operation.

TABLE 1

| Catalyst A Performance | | | | | |
|---|---|---|---|---|---|
| Temperature (°C.) | 350 | 400 | 450 | 500 | 550 |
| Conversion (%) | 11.1 | 34.6 | 67.3 | 83.5 | 97.6 |
| $H_2$ Selectivity (%) | 73.5 | 64.9 | 58.6 | 56.3 | 53.1 |
| CO Selectivity (%) | 7.6 | 6.5 | 9.8 | 13.4 | 17.2 |
| $CO_2$ Selectivity (%) | 62.6 | 54.9 | 48.0 | 42.6 | 37.1 |
| $H2/CO + CO_2$ | 2.35 | 2.32 | 2.07 | 2.02 | 1.90 |

The data presented in Table 1 above indicates that Catalyst A, which is a copper, magnesium and alumina catalyst, provides acceptable dimethyl ether conversion with desirable selectivities, especially in the range of about 450 to about 500 degrees C. operating temperature. However, the trend of the hydrogen to carbon oxide molar ratio is downward with increasing temperature.

TABLE 2

| Catalyst B Performance | | | | | | |
|---|---|---|---|---|---|---|
| Temperature (°C.) | 350 | 400 | 450 | 500 | 550 | 650 |
| Conversion (%) | 5.9 | 7.4 | 9.5 | 17.8 | 21.1 | 55.4 |
| $H_2$ Selectivity (%) | 69.8 | 68.8 | 81.8 | 84.6 | 78.0 | 67.9 |
| CO Selectivity (%) | 8.5 | 4.0 | 4.5 | 13.8 | 3.8 | 12.2 |
| $CO_2$ Selectivity (%) | 57.8 | 60.2 | 72.3 | 67.7 | 68.9 | 52.2 |
| $H_2$ to Carbon Oxide Ratio | 2.35 | 2.45 | 2.72 | 2.49 | 2.67 | 2.34 |

Inspection of Table 2 reveals that Catalyst B, which is a copper, zinc and aluminum catalyst, is less active as compared to Catalyst A but provides relatively higher selectivities for hydrogen and carbon dioxide. It appears that the zinc facilitates the conversion of carbon monoxide to carbon dioxide, with an attendant increase in hydrogen production.

TABLE 3

| Catalyst C Performance | | | | | |
|---|---|---|---|---|---|
| Temperature (°C.) | 300 | 400 | 450 | 500 | 550 |
| Conversion (%) | 6.1 | 18.3 | 44.6 | 75.9 | 91.1 |
| $H_2$ Selectivity (%) | 55.6 | 71.2 | 75.6 | 78.2 | 80.4 |
| CO Selectivity (%) | 14.3 | 18.8 | 16.3 | 34.41 | 44.9 |
| $CO_2$ Selectivity (%) | 35.5 | 44.3 | 50.4 | 37.9 | 30.9 |
| $H_2$ to Carbon Oxide Ratio | 2.52 | 2.90 | 3.09 | 2.76 | 2.61 |

Catalyst C is a copper, zinc and alumina catalyst, but having a higher metals content as compared to Catalyst B. The data in Table 3 indicate that the higher metals content catalyst is more active. Particularly, the 450 degree C data for Catalyst C represent a very attractive balance between conversion and selectivity.

TABLE 4

Catalyst D Performance

| Temperature (°C.) | 350 | 400 |
|---|---|---|
| Conversion (%) | 88.5 | 99.9 |
| $H_2$ Selectivity (%) | 96.9 | 96.2 |
| CO Selectivity (%) | 49.3 | 50.96 |
| $CO_2$ Selectivity (%) | 47.1 | 44.8 |
| $H_2$ to Carbon Oxide Ratio | 2.44 | 2.42 |

The data in Table 3 demonstrate that Catalyst D, a commercially available catalyst containing copper, zinc and alumina, effectively hydroshifts dimethyl ether at temperatures of about 350 to about 400 degrees C. Catalyst D provides high conversions, desirable selectivities and good hydrogen to carbon oxide molar ratios.

TABLE 5

Catalyst E Performance

| Temperature (°C.) | | | | | |
|---|---|---|---|---|---|
| Ext Product (mole %) | 300 | 350 | 400 | 450 | 500 |
| $H_2$ | 1.636 | 2.697 | 2.966 | 4.841 | 9.167 |
| $N_2$ | 63.575 | 63.294 | 62.804 | 60.947 | 56.723 |
| CO | 0.427 | 0.188 | 0.935 | 1.249 | 1.152 |
| $CH_4$ | 0.259 | 0.799 | 0.916 | 1.446 | 3.094 |
| $CO_2$ | 0.337 | 0.67 | 0.633 | 0.936 | 2.348 |
| $H_2O$ | 2.449 | 2.663 | 2.515 | 2.505 | 2.537 |
| DME | 31.318 | 29.69 | 29.23 | 28.076 | 24.979 |
| Ratio | | | | | |
| $H_2/CO_2$ | 4.85 | 4.03 | 4.69 | 5.17 | 3.90 |
| $H_2/(CO + CO_2)$ | 2.14 | 3.14 | 1.89 | 2.22 | 2.62 |
| Conversion (%) | | | | | |
| DME Selectivity (%) | 2.71 | 7.57 | 9.14 | 12.74 | 22.34 |
| $H_2$ | 75.95 | 62.79 | 61.82 | 62.60 | 59.70 |
| CO | 41.74 | 11.35 | 37.64 | 34.40 | 17.47 |
| $CH_4$ | 25.32 | 48.22 | 36.88 | 39.82 | 46.92 |
| $CO_2$ | 32.94 | 40.43 | 25.48 | 25.78 | 35.61 |

The data presented in Table 5 shows the effect of potassium, an alkali metal, on dimethyl ether hydroshifting performance. Catalyst E is substantially similar to Catalyst D, except that two per cent by weight of potassium has been impregnated and calcined on Catalyst E. The data in Tables 4 and 5 for Catalysts D and E, respectively, may be compared directly at 350 and at 400 degrees C. The comparisons indicate that the presence of potassium causes a significant decrease in the activity and the selectivity of

TABLE 6

Catalyst F Performance

| Temperature (°C.) | 300 | 350 | 400 | 450 | 500 | 550 |
|---|---|---|---|---|---|---|
| Conversion (%) | 4.9 | 18.7 | 51.7 | 56.0 | 83.4 | 91.3 |
| $H_2$ Selectivity (%) | 85.9 | 82.1 | 77.6 | 70.0 | 69.2 | 66.0 |
| CO Selectivity (%) | 6.9 | 3.7 | 5.3 | 7.4 | 17.4 | 24.8 |
| $CO_2$ Selectivity (%) | 74.9 | 73.8 | 67.2 | 58.4 | 48.6 | 39.6 |
| $H_2$ to Carbon Oxide Ratio | 2.72 | 2.68 | 2.63 | 2.4 | 2.3 | 2.14 |

A commercially available catalyst having chromium as an active metal was evaluated under hydroshifting conditions. The resulting data is presented as Table 6. The data indicates that a chromium-based catalyst can convert dimethyl ether and steam to a hydrogen and carbon oxides product with a relatively high selectivity for carbon dioxide.

Samples of the commercially available catalyst designated Catalyst D, described in Example 7 above, were observed under hydroshifting conditions with various steam rates. In each case, the space velocity of dimethyl ether charged to the reactor was controlled at 2000 GHSV and the space velocity of nitrogen charged to the reactor was controlled at 1000 GHSV. The amount of steam entering the reactor, if any, was adjusted to provide the desired dimethyl ether to steam molar ratio. The resulting data is presented below, as Table 7.

TABLE 7

Effect of Steam Ratio on Catalyst D

| Temperature °C. | 350 | 350 | 350 | 400 | 400 | 400 | 400 | 400 |
|---|---|---|---|---|---|---|---|---|
| Molar Feed Ratio ($DME/H_2O$) | 1:0 | 1:1 | 1:3 | 1:0 | 1:1 | 1:2 | 1:3 | 1:4 |
| Conversion (%) | 20.1 | 48.6 | 88.5 | 18.5 | 76.6 | 86.3 | 41.2 | 93.8 |
| Selectivity (%) | | | | | | | | |
| $H_2$ | 61.7 | 98.5 | 96.9 | 50.5 | 98.3 | 99.3 | 99.4 | 99.5 |
| CO | 55.5 | 18.8 | 49.3 | 40.6 | 38.2 | 23.6 | 23.0 | 20.4 |
| $CO_2$ | 9.22 | 79.1 | 47.1 | 15.7 | 59.7 | 75.4 | 76.2 | 78.9 |
| Ratio | | | | | | | | |
| $H_2/CO + CO_2$ | 1.75 | 2.73 | 2.44 | 1.60 | 2.59 | 2.75 | 2.75 | 2.77 |

The data in Table 7 indicates that steam is a necessary reactant for the hydroshifting reaction, as distinguished from the relatively unselective decomposition of dimethyl ether observed at 350 and 400 degrees C. when no steam was charged to the reactor. Charging steam at 1.0 molar ratio dramatically improved dimethyl ether conversion and selectivity for hydrogen. Increasing the molar steam ratio over the range of 1.0 to 4.0 decreased the proportion of carbon monoxide in the product stream and increased the proportions of hydrogen and carbon monoxide. Greater steam ratios in the 1.0 to 4.0 range aim tended to increase dimethyl ether conversion.

Samples of the commercially available catalyst designated Catalyst D, described in Example 7 above, were also observed under hydroshifting conditions wi at 100 psig total pressure. The molar proportions of dimethyl ether, steam and nitrogen charged to the reactor were nominally 1 to 3. A space velocity of 3000 GHSV was employed at 350 and 400 degrees C. The resulting data appears below as Table 8.

TABLE 8

Catalyst D at 100 Psig Total Pressure

| Temperature (°C.) | 350 | 400 |
|---|---|---|
| Conversion (%) | 69.9 | 100 |
| $H_2$ Selectivity (%) | 99.1 | 99.6 |
| CO Selectivity (%) | 7.2 | 39.7 |
| $CO_2$ Selectivity (%) | 91.5 | 59.9 |
| $H_2$ to Carbon Oxide Ratio | 2.80 | 2.49 |

Although a direct comparison is not possible due to a difference in the proportion of nitrogen charged, inspection of the data in Table 8 and the data in Table 7 indicates that the conversions and selectivities observed for Catalyst D are reasonably insensitive to changes in total pressure and can serve as guides for scale-up to higher pressure hydroshifting operation.

For the purposes of the present invention, "predominantly" is defined as more than about fifty per cent. "Substantially" is defined as ocurring with sufficient frequency or being present in such proportions as to measurably affect macroscopic properties of an associated compound or system. Where the frequency or proportion for such impact is not clear, substantially is to be regarded as about twenty per cent or more. "Essentially" is defined as absolutely except that small variations which have no more than a negligible effect on macroscopic qualities and final outcome are permitted, typically up to about one percent.

Examples have been presented and hypotheses advanced herein in order to better communicate certain facets of the invention. The scope of the invention is determined solely by the scope of the appended claims.

We claim as our invention:

1. A process for hydroshifting dimethyl ether and producing a combustion product stream, which comprises:

passing a feed stream which includes about one to about six molar parts steam and one molar part dimethyl ether at a temperature of about 150 to about 800 degrees C. to a hydroshifting reaction zone including an essentially alkali metal-free catalytic composition substantially composed of copper or nickel in elemental form to produce a hydroshifted stream which is relatively rich in hydrogen, carbon monoxide and carbon dioxide as compared to the feed stream, and mixing an oxidizer stream including oxygen with the hydroshifted stream and combusting the hydroshifted stream to produce heat and a combustion product stream.

2. The process of claim 1 wherein the hydroshifting reaction zone additionally contains a water gas shift reaction catalyst substantially composed of an easily reducible first row transition metal.

3. A process for hydroshifting dimethyl ether and producing a combustion product stream, which comprises:

passing a feed stream which includes about one to about six molar parts steam and one molar part dimethyl ether at a temperature of about 300 to about 800 degrees C. to a hydrolysis reaction zone including an essentially alkali metal-free catalytic composition substantially composed of a non-noble metal in elemental form to produce a hydrolyzed stream which is relatively rich in hydrogen, carbon monoxide and carbon dioxide as compared to the feed stream, passing the hydrolyzed stream at a temperature of about 150 to less than about 300 degrees C. to a water gas shift reaction zone including a water gas shift reaction catalyst to produce a hydroshifted stream which is relatively rich in hydrogen and carbon dioxide as compared to the hydrolyzed stream, and mixing an oxidizer stream including oxygen with the hydroshifted stream and combusting the hydroshifted stream to produce heat and a combustion product stream.

4. The process of claim 3 wherein the hydrolysis reaction zone is at a temperature in the range of about 350 to about 500 degrees C.

5. The process of claim 3 wherein the water gas shift reaction zone is at a temperature of about 150 to about 250 degrees C.

6. The process of claim 3 wherein additional steam is passed to the water shift reaction zone simultaneously with the hydrolyzed stream so that the total steam passed to the reaction zones is about two to about four molar parts for each molar part of dimethyl ether passed to the hydrolysis reaction zone.

7. The process of claim 3 wherein the oxidizer stream includes air as a source of oxygen.

8. The process of claim 7 which further comprises passing a reducing stream into proximity with the catalytic composition in the hydroshifting reaction zone at a temperature of about 200 to about 1000 degrees C. in order to reduce a significant portion of the non-noble metal to elemental form.

9. A process for hydroshifting dimethyl ether and generating power, which comprises:

vaporizing a predominantly liquid mixture charge stream to produce a predominantly gaseous feed stream which includes one molar part dimethyl ether and about one to about six molar parts steam;

passing the feed stream at a temperature of about 150 to about 800 degrees C. to a hydroshifting reaction zone including an essentially alkali metal-free catalytic composition substantially composed of a metal in elemental form to produce a hydroshifted stream which is relatively rich in hydrogen, carbon monoxide and carbon dioxide as compared to the feed stream;

mixing an oxidizer stream including inert material and oxygen with the hydroshifted stream and combusting the hydroshifted stream to produce heat and a combustion product stream; and driving a turbine with the combustion product stream to produce an exhaust stream and to generate mechanical power.

10. The process of claim 9 wherein the oxidizer stream includes air as a source of inert material and oxygen.

11. The process of claim 10 wherein the hydroshifting zone includes a hydrolysis zone containing the catalytic composition in which stem reacts endothermically with dimethyl ether and a water gas shift zone containing a water gas shift catalyst in which steam reacts exothermically with carbon monoxide.

12. The process of claim 11 wherein the feed stream is charged to the hydrolysis zone at a temperature of about 300 to about 800 degrees C. to produce a hydrolyzed stream which is rich in hydrogen, carbon monoxide and carbon dioxide as compared to the feed stream and wherein the hydrolyzed stream is passed to the water gas shift zone at a temperature of about 150 to less than about 300 degrees C. to produce the hydroshifted stream.

13. The process of claim 11 wherein the catalytic composition is substantially composed of copper and zinc in elemental form.

14. The process of claim 11 wherein the water gas shift reaction catalyst comprises oxides of copper and zinc.

15. The process of claim 11 wherein additional steam is passed to the water shift reaction zone simultaneously with the hydrolyzed stream so that the total steam passed to the reaction zones is about two to about four molar parts for each molar part of dimethyl ether passed to the hydrolysis reaction zone.

16. The process of claim 11 which further comprises passing a reducing stream including a reducing agent selected from the group consisting of hydrogen, carbon monoxide, methane, ethane, propane, methanol, ethanol and mixtures thereof into the hydroshifting reaction zone to reduce a significant portion of the metal to elemental form.

17. The process of claim 11 wherein the reducing stream is passed into proximity with the catalytic composition at a temperature of about 200 to about 1000 degrees C.

18. The process of claim 11 wherein a reducing stream is passed to the hydroshifting zone to reduce the metal.

19. The process of claim 11 wherein heat from the exhaust stream is transferred to the hydroshifting reaction zone.

20. The process of claim 11 wherein heat from the exhaust stream is utilized to vaporize the charge stream.

* * * * *